Oct. 7, 1947.　　　　W. W. BUESE　　　2,428,651
ADJUSTABLE MOUNTING FOR STEERABLE WHEEL SPINDLES
Filed March 13, 1945

BEARING CUP

INVENTOR.
WILLIAM W. BUESE

ATTORNEYS

Patented Oct. 7, 1947

2,428,651

UNITED STATES PATENT OFFICE 2,428,651

ADJUSTABLE MOUNTING FOR STEERABLE WHEEL SPINDLES

William Walter Buese, St. Louis, Mo.

Application March 13, 1945, Serial No. 582,453

1 Claim. (Cl. 280—96.1)

The invention relates to a vehicle wheel spindle, and more especially to an adjustable spindle for motor vehicles or the like.

The primary object of the invention is the provision of a spindle of this character, wherein easy steering is assured, eliminates shimmying and permits adjustment for wheel alignment purposes.

Another object of the invention is the provision of a spindle of this character, wherein it eliminates costly and timely rebushing jobs, and it is susceptible of easy adjustment to take up wear and play.

A further object of the invention is the provision of a spindle of this character, which is simple in construction, thoroughly reliable and efficient in operation, strong, durable, readily and easily adjusted, conveniently assembled with an axle beam or the like, and inexpensive to manufacture and install.

With these and other objects in view, the invention consists in the features of construction, combination and arrangement of parts as will be hereinafter more fully described, illustrated in the accompanying drawing, which shows the preferred embodiment of the invention and pointed out in the claim hereunto appended.

In the accompanying drawing.

Similar reference characters indicate corresponding parts throughout the several views in the drawing.

Figure 1:
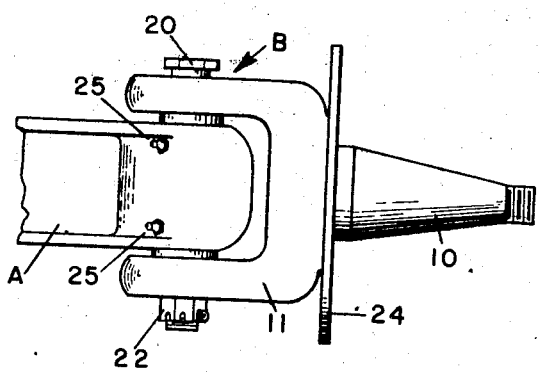
Figure 1 is a fragmentary side view of an axle showing the spindle constructed in accordance with the invention applied.
Figure 3:
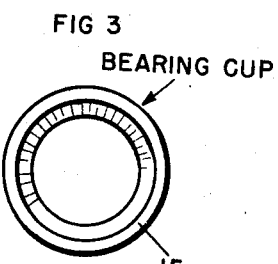
Figure 3 is a plan view of one of the bearing cups used with the spindle.
Figure 2:
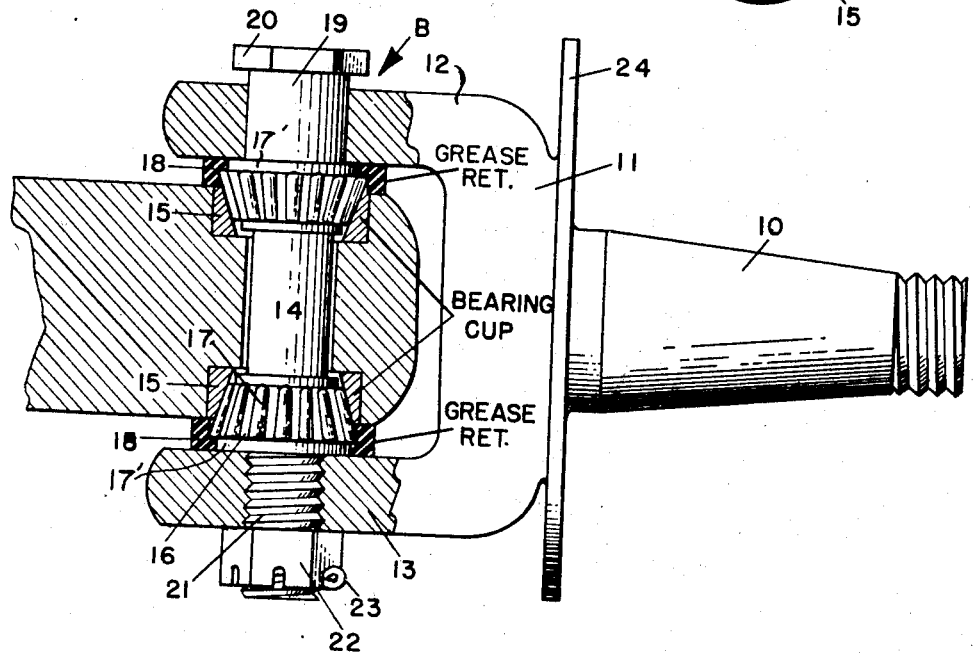
Figure 2 is an enlarged fragmentary side view partly in section.

Referring to the drawing in detail, A designates generally the outer end portion of an axle beam employed in motor vehicles, while B denotes the adjustable spindle in its entirety as constructed in accordance with the invention, and hereinafter set forth in detail.

The spindle B comprises an outwardly tapered journal 10 provided at its innermost end with a substantially C-shaped yoke 11 which has its upper and lower limbs 12 and 13, respectively, provided with vertical clearances for an externally stepped pivot pin 14, about which are the bearing cups 15, these being counterseated in the upper and lower faces of the axle A. In these cups 15 are received the reversely beveled bearing cages 16 for bearing rollers 17 having the flanged inner race 17'.

Crowning the cages 15 with the rollers 17 therein are grease retainer capping rings 18, which are interposed between the opposite faces of the axle A and the limbs 12 and 13 of the yoke 11. The step 19 next to the upper end of the pin 14 snugly fits the clearance therefor in the upper limb 12, but being of larger diameter than the flange of the inner race 17' of the rollers 17, will bear against the innner race to force the rollers in close contact with the cups 15, and this end of the pin is formed with a wrench engaging head 20, while the opposite lower end of such pin 14 is screw-threaded at 21, and such end is threadably mounted in the lower limb 13. The rollers are loosely mounted on the pin 14, and the flange of the inner race of the lower rollers 17 will engage the lower limb 13.

The threaded end 21 of the pin 14 has removably fitted thereon a threaded nut 22, which is locked in place by a cotter pin 23, the latter being also engaged in the end 21.

At the juncture of the journal 10 and the yoke 11 is a thrust resisting flange 24, which is integral therewith.

Let in through the axle A to the pin 14 are lubricant supply nipples 25 of any approved or well known construction.

It should be noted that the yoke is a part of the journal 10, in contradistinction to being a part of the axle beam or the like A, and in this manner providing movement of the yoke with respect to the axle beam A. Furthermore, in the adjustment of the spindle, there is need for lifting the wheel journaled thereon from the ground, since the spindle cannot be readily and easily adjusted while the wheel is in contact with the ground. With the wheel out of contact with the ground, thus permitting movement of the axle A within the yoke 11, the cotter key 23 is removed and the nut 22 loosened. The head 20 of the pin 14 is then turned through the medium of a wrench and the step 19 engaging the flange of the inner race 17' of the rollers 17, forces the rollers downwardly into the cups 15. Further tightening of the head 20 will force the axle A downwardly, causing the lower cage 15 to be forced downwardly onto the flange of the inner race 17' of the lower rollers 17. Downward movement of the lower rollers 17 is prevented, since the inner race is in contact with the lower limb 13. During the downward movement of the pin 14, the threaded end 21 of the pin is threaded onto the lower limb 13, and movement of the pin is continued until all slack is removed. The nut 22 is then replaced to retain the adjustment, and the cotter key is then replaced to prevent loosening of the nut. Thus all slack is removed, and the wheel can then be lowered into contact with the ground.

What is claimed is:

An adjustable spindle of the character described, comprising a journal, a substantially C-shaped yoke for mounting the spindle at the inner portion of the journal, said yoke having an upper limb and a lower limb, an opening in the upper limb of said yoke and a threaded opening in the lower limb thereof, a pivot pin connecting the yoke with an axle beam and having a wrench engaging head and a threaded end for engaging the threaded opening in the lower limb of the yoke, a stepped portion on said pin below said wrench engaging head, bearing cups counterseated in the axle beam and about the pin interiorly of the yoke, reversely beveled bearing cages and roller bearings fitting in the cups, a nut for engaging the threaded end of the pin and locking means for the nut.

WILLIAM WALTER BUESE.

REFERENCES CITED

The following references are of record in the file of this patent:

UNITED STATES PATENTS

| Number | Name | Date |
|---|---|---|
| 2,094,945 | Hesselrode | Oct. 5, 1937 |
| 1,966,795 | Garrison | July 17, 1934 |
| 1,932,340 | Goltry | Oct. 24, 1933 |
| 1,474,361 | Harris | Nov. 29, 1923 |